July 3, 1956     E. WILDHABER     2,752,765
UNIVERSAL JOINT
Filed July 1, 1952     3 Sheets-Sheet 1
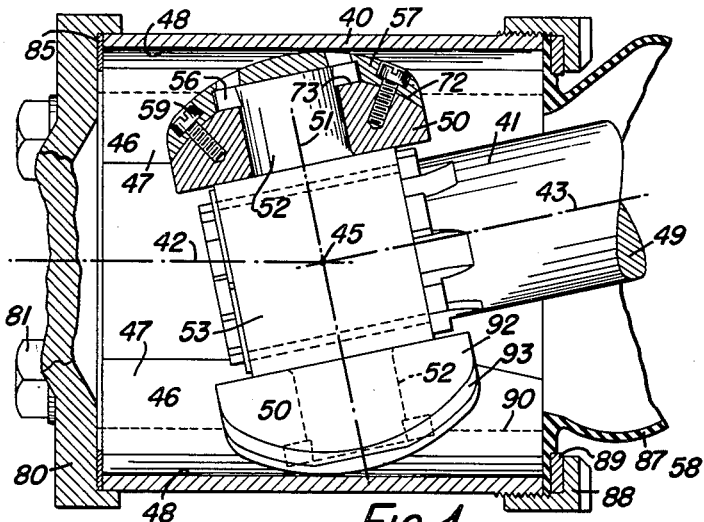
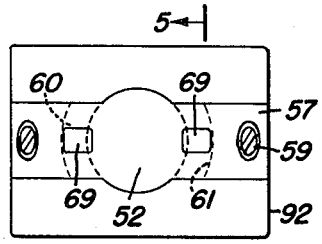
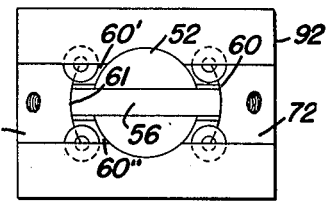
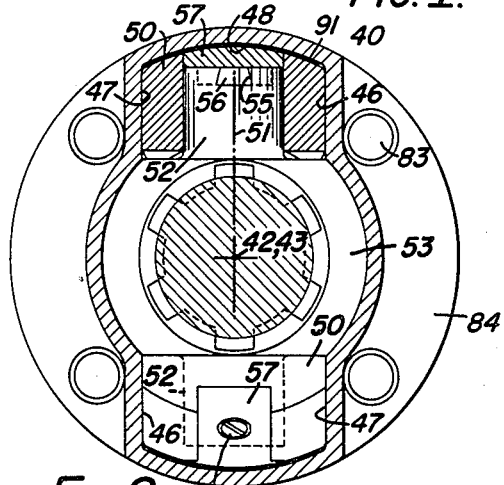
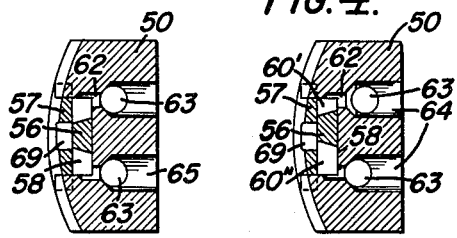
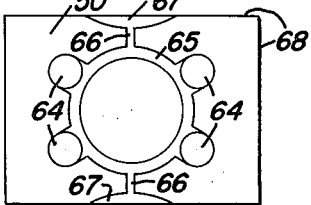
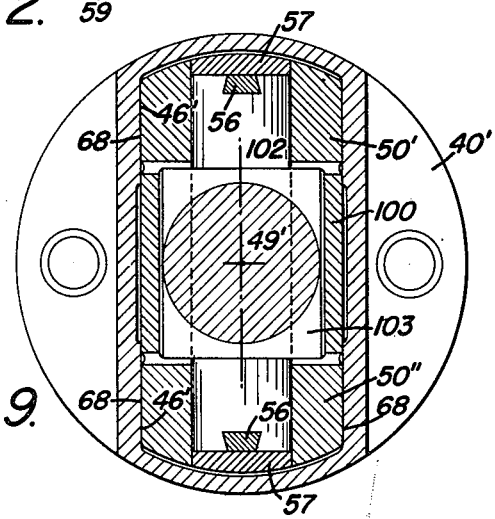
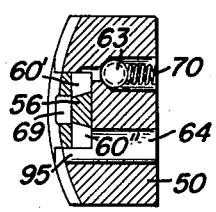
INVENTOR.
ERNEST WILDHABER
BY
ATTORNEY

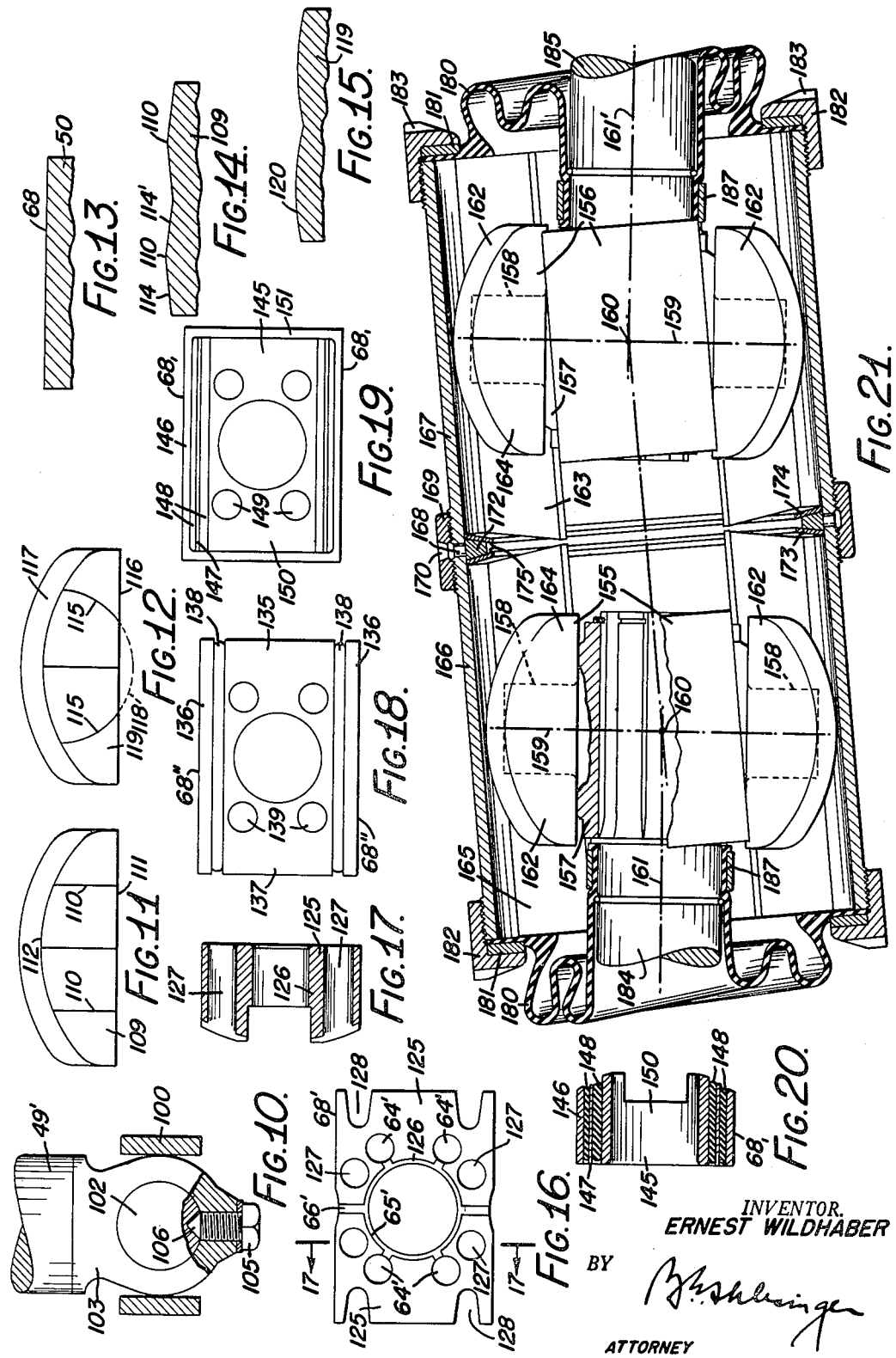

July 3, 1956     E. WILDHABER     2,752,765
UNIVERSAL JOINT
Filed July 1, 1952     3 Sheets-Sheet 3
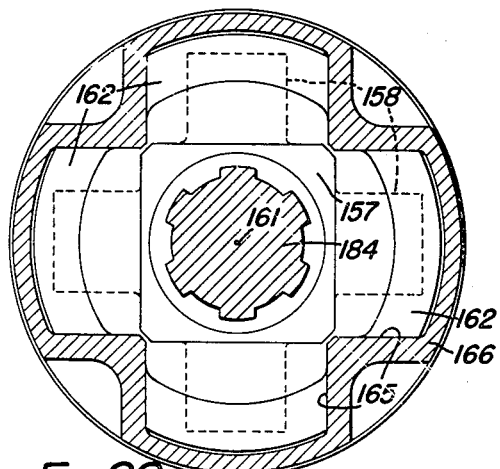
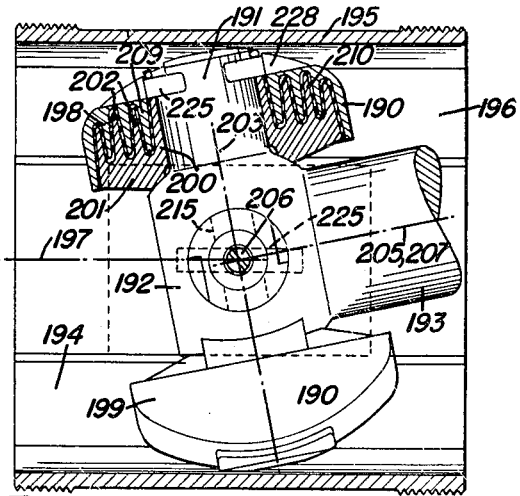
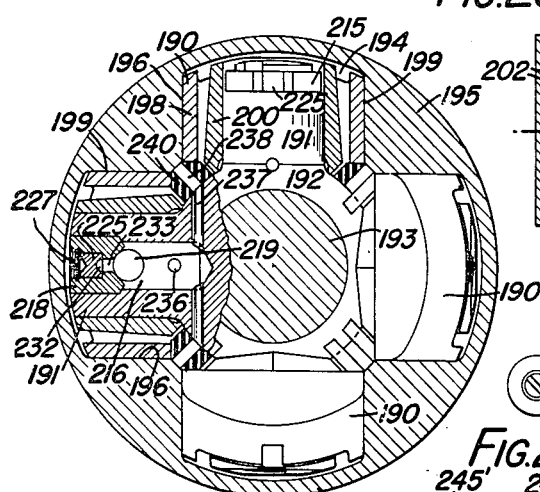
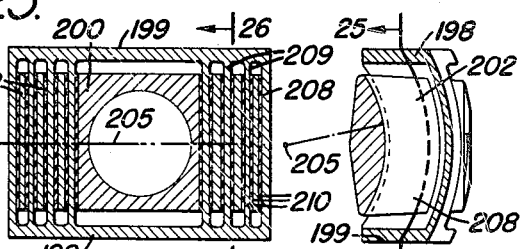
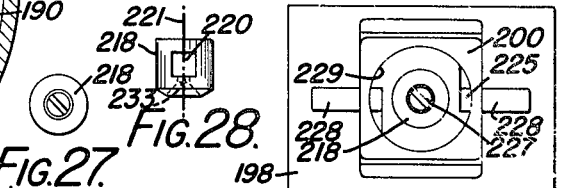
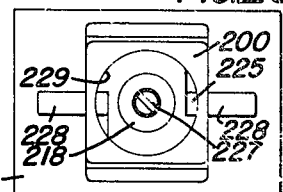
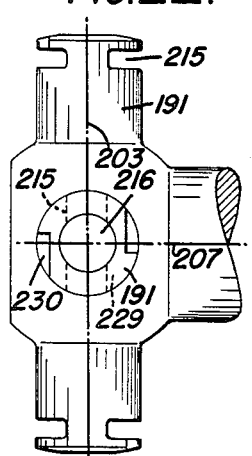
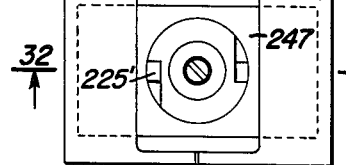
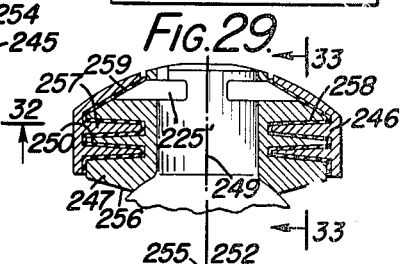
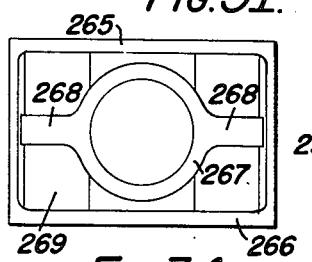
INVENTOR.
ERNEST WILDHABER
BY
ATTORNEY

United States Patent Office 2,752,765
Patented July 3, 1956

2,752,765

UNIVERSAL JOINT

Ernest Wildhaber, Brighton, N. Y.

Application July 1, 1952, Serial No. 296,572

11 Claims. (Cl. 64—8)

The present invention relates to universal joints, and more particularly to a universal joint of the type in which the connection between the end members of the joint is achieved through blocks pivoted on one of said end members and having sliding engagement with the other end member.

One object of the present invention is to provide a universal joint of increased life and increased load capacity.

Another object of the invention is to increase the life and load capacity of a joint of the particular type above mentioned by improved lubrication including forced lubrication of each pivot of the joint.

A further object of the invention is to provide a universal joint of the character particularly described in which forced lubrication is achieved through the pivotal motion of the blocks on their pivots.

Another object of the invention is to provide a joint of the character specifically mentioned in which both the pivot and the block itself are lubricated with oil positively displaced through the pivotal motion of the blocks on their pivots.

Another object of the invention is to provide an improved type of sliding block which reduces splashing of the lubricant in operation of the joint.

A further object of the invention is to provide a universal joint having pivoted sliding blocks whose sliding portions are yieldingly connected with one end member of the joint.

Another object of the invention is to provide a pivoted sliding block for universal joints in which opposite sliding portions of the block are rigid with one another but are yieldingly connected with a central hub portion that is mounted on the pivot member for the block.

Still another object of the invention is to provide a universal joint with sliding blocks mounted on a plurality of pivots, where the sliding portions of the blocks are yieldingly connected with their hub portions which, in turn, are mounted on the pivots.

A further object of the invention is to improve the sliding surfaces of the sliding blocks to provide improved lubrication.

Other objects of the invention will be apparent hereinafter from the specification and from the recital of the appended claims.

In the drawings:

Fig. 1 is an axial section of a universal joint constructed according to one embodiment of this invention;

Fig. 2 is a part transverse section, part end view of the joint shown in Fig. 1, but with the axes of the joint in alignment;

Fig. 3 is a plan view of one of the sliding blocks of the joint shown in Figs. 1 and 2, the view being taken along the pivot axis of the block;

Fig. 4 is a view similar to Fig. 3, but with the central cover portion of the block removed, showing the pumping bar connected with the pivot;

Fig. 5 is a section along the line 5—5 of Fig. 3, looking in the direction of the arrows;

Fig. 6 is a section similar to Fig. 5 but with the parts in a different turning position of the block, and showing how the oil is positively displaced by the pivotal motion of the block;

Fig. 7 is a bottom plan view of the block;

Fig. 8 is a section similar to Fig. 5, showing a slightly modified form of sliding block;

Fig. 9 is a cross section similar to Fig. 2 illustrative of a further embodiment of the invention;

Fig. 10 is a fragmentary view taken from the bottom of Fig. 9, with parts broken away and shown in section;

Figs. 11 and 12 are somewhat diagrammatic side views of sliding blocks made according to two different embodiments of the present invention and illustrating blocks having sides with very shallow ridges of different shapes, respectively, to improve the lubrication of the blocks in their sliding motion;

Fig. 13 is a fragmentary transverse section through a block having a side of straight longitudinal profile;

Fig. 14 is a fragmentary section, similar to Fig. 13, through a block such as shown in either Fig. 11 or Fig. 12;

Fig. 15 is a section similar to Figs. 13 and 14, through a block such as shown in either Fig. 11 or Fig. 12;

Fig. 16 is a bottom view of a modified form of sliding block made of a non-metallic material and designed to be moderately yielding;

Fig. 17 is a section on the line 17—17 of Fig. 16;

Fig. 18 is a bottom view of a still further form of sliding block, in which the side portions or plates are yieldingly connected with the central part or hub portion of the block;

Fig. 19 is a bottom view of a still further embodiment of sliding block, the portions containing the two sliding sides being rigid with one another and being yieldingly connected with the central or hub portion of the block;

Fig. 20 is a section, similar to Fig. 17, but taken axially through the block of Fig. 19;

Fig. 21 is an axial section of a universal coupling with two joints made according to the present invention, each joint containing a plurality of yielding sliding blocks pivoted on a plurality of axes;

Fig. 22 is a transverse section through the coupling shown in Fig. 21;

Fig. 23 is a part axial section, part side view of a universal joint constructed according to a further embodiment of the invention;

Fig. 24 is a transverse section of the joint shown in Fig. 23;

Fig. 25 is a section of one of the sliding blocks of the joint of Figs. 23 and 24 taken along the line 25—25 of Fig. 26, looking in the direction of the arrows, and generally perpendicular to the pivot axis;

Fig. 26 is a section along the line 26—26 of Fig. 25, looking in the direction of the arrows;

Figs. 27 and 28 are views taken at right angles to one another of a combined plug and valve seat used in each of the pivot portions of the embodiment of the invention shown in Figs. 23 and 24;

Fig. 29 is a top plan view of a sliding block such as used in this embodiment of the invention;

Fig. 30 is a side view of the spider member employed in the joint shown in Figs. 23 and 24;

Fig. 31 is a top plan view, similar to Fig. 29, of a modified form of sliding block, looking along its pivot axis;

Fig. 32 is a section along the line 32—32 of Fig. 31, looking in the direction of the arrows;

Fig. 33 is a section on the line 33—33 of Fig. 32, looking in the direction of the arrows; and Fig. 34 is a bottom plan view of a still further form of sliding block made according to the present invention and having yielding portions.

Referring now to Figs. 1 and 2, 40 and 41 denote, respectively, the two end members of a universal joint. These end members have axes 42 and 43, respectively, which intersect in a point 45. The end member 40 is formed internally with a pair of diametrically opposite straight ways 46 which extend axially for the full length of the member 40. These ways have parallel plane sides 47; and the bottom surface 48 of each way is part of a cylindrical surface coaxial with end member 40 and with its axis 42.

The ways 46 are engaged by sliding blocks 50 pivotally mounted on the end member 41 on a common axis 51 radial of the axis 43 of the end member 41. End member 41 comprises a shaft 49 and a hub member 53 that has splined connection with the shaft. Hub member 53 has diametrically-opposed, radially-projecting pivot portions 52.

At its outside end each pivot portion 52 is formed with a dove-tailed slot 55 (Fig. 2) which extends parallel to the axis 42 of the end member 41. These slots can be produced rapidly by broaching. Each slot 55 is engaged by a bar 56 (Fig. 4), preferably with a press fit. One end, or preferably both ends, of the bar 56 projects beyond the cylindrical outside surface of the pivot portion 52.

Each of the sliding blocks 50 contains a central slot 58 (Figs. 4, 5 and 6) which extends parallel to the working sides of the block and which is wide enough to clear the ends of the associated bar 56 at the maximum angles of oscillation of the bar.

A cover 57 fits between the side walls of each slot 58 and is secured to the associated sliding block 50 by screws 59. These are tightened in a fixture for proper alignment of the cover and block. The cover is shaped to leave two arcuate spaces 60 of the slot 58 between itself and the block 50, at opposite sides of the associated pivot 52, for the associated bar 56 to oscillate in. These spaces are sectors bounded by walls 61 formed in the cover concentric of pivot axis 51. Each bar 56 has a cylindrical outside surface which contacts at its opposite ends the cylindrical inside surfaces 61 provided in the cover 57. The top and bottom faces of the bar are plane. They contact with matching plane surfaces of the cover and of the sliding block 50.

Each bar 56 divides each of the associated spaces 60 into two parts denoted at 60' and 60" in Fig. 4 whose volume constantly varies in operation of the joint at shaft angularity. Fig. 5 shows a bar 56 in central position, while Fig. 6 is a section showing the bar 56 so that at one end of the bar the part 60' of space 60 is smaller than the part 60" thereof.

Each block is formed with four holes or ducts 62 (Figs. 5 and 6), two of which communicate with each of the arcuate slots 60 formed at opposite ends in the block. The four ducts 62 communicate, respectively, with four ducts 64, ball valves 63 being provided to open and shut off communication between associated ducts 62 and 64. All the ducts 64 of a block 50 communicate at the bottom of that block with an annular space 65. This in turn is connected by radial ducts 66 with two diametrically disposed recesses 67 that supply oil to the sliding parallel side surfaces 68 of the block.

Assuming that the bar 56 of a block is moving in Fig. 6 in a direction to further reduce the size of the part 60' of the space 60 at one end of the bar, then the oil in this part 60' is pressed through the passage 62 indicated in Fig. 6 past associated ball valve 63, through associated duct 64 to the bottom of the block 50. Thence it flows into the annular space 65 around the associated pivot portion 52, as best seen in the bottom view of the block (Fig. 7). From this annular space 65 part of the oil flows outwardly along the cylindrical pivot portion 52 under the action of centrifugal force, that is, inertia, lubricating the pivot. Another part of the oil flows through channels 66 and recesses 67 to the outside working sides 68 of the block, that is, to its sliding surfaces. While this is occurring, the other part 60" of the space 60 increases in volume, creating a suction which draws in oil from the supply of lubricant in end member 40 through the openings 69 (Figs. 3, 5 and 6) formed in each cover 57.

When the motion of bar 56 is in the opposite direction, so as to increase the volume of part 60' and reduce the volume of the part 60" of a space 60, the oil in portion 60" merely flows out again through the opening 69 of the associated cover 57 until the middle position is reached, without a substantial rise in pressure. When the middle position is reached, the passage 69 is closed off by the bar 56. Thereafter pressure develops in the diminishing space 60". Ball 63 in the duct communicating with this space is then lifted from its seat and opens up the associated passage 64 that leads to the bottom of the block 50. Thus the oil from part 60" is forced into the annular space 65 in the bottom of the block and through the ducts 66 of the kerfs 67 in the sliding side surfaces 68 of the block, lubricating these sliding surfaces. The part 60' of the space 60 increases in volume, as the part 60" decreases in volume. Hence, a vacuum is created in part 60'. This vacuum becomes active once the middle position is passed and then helps to draw in oil through the associated opening 69 as soon as that opening is cleared by the end of the bar. Part 60' fills with oil as it further increases in volume. In the return stroke this oil passes out, as before, through opening 69 until the middle position is reached; then opening 69 is closed by the bar. Then pressure develops as the volume of the part 60' further diminishes.

It will be seen then that the pivotal motion of the blocks 50 themselves in operation of the joint serve not only to lubricate the pivots 52 but also the sliding sides 68 of the blocks themselves.

For operation at high speed the valve balls 63 are preferably made of relatively light specific gravity, lighter than half the specific gravity of steel. This is to avoid unduly large pressure being required to lift them off their seats. In the limit case the balls 63 may be made of a material having a specific gravity very slightly larger than the specific gravity of the lubricating oil employed. If it were equal thereto the balls would have no tendency to seat themselves by weight. A spring would then have to be used with each ball in order to seat it. Such a spring is shown in Fig. 8 at 70 as applied to one of the balls 63.

One way of providing balls of reduced specific gravity is to make them out of a relatively light material. Also the balls may be made of a light material and plated with metal. They also may be made of a heavy metal, like steel, but hollow.

It is understood that the sliding surfaces of the bar 56 should be made to have sliding fit to avoid undue leakage.

The bottom of the central slot 58 (Fig. 4) of each sliding block 50 is composed of two spaced convex spherical surfaces 72 separated by a central plane surface 73 (Fig. 1). The spherical surfaces are centered at 45. The cover 57 has matching surfaces.

The end member 40 has, as already stated, internal ways 46 that have plane side surfaces 47. At its left hand end the member 40 is secured to a cup member 80 (Fig. 1) by means of screws 81 which thread into holes 83 (Fig. 2) in the flange 84 of the end member 40. A gasket 85 is interposed between the end member 40 and the cup member 80. The cup member forms a driving connection between the end member 40 and one of the two shafts connected by the joint, as will readily be understood. To the opposite end of the end member 40 a flexible seal 87 is tightly secured by means of a flanged nut 88. This nut threads onto the outside of the end member 40 and applies pressure to the seal 87 through a disc 89. The opposite end of the seal (not shown) is tightly secured to the shaft 43.

The lubricant, preferably oil, used in the joint is put into member 40. It moves radially outwardly by centrifugal force when the joint is in operation. It may then form a level, such as indicated in dotted lines at 90 in Fig. 1. In accordance with my invention, I preferably streamline the ends of the sliding blocks 50 to reduce splashing of oil. The blocks 50 are also formed with outside spherical surfaces 91 (Fig. 2); and these are connected with the end surfaces 92 (Fig. 1) of the blocks by well-rounded portions 93. Also, I preferably make the length of the sliding blocks larger than their width. The effect as to splashing can be observed in Fig. 1. With long blocks the oil level hardly reaches the ends at the outside surfaces 92 of the blocks. This outside surface is spherical and it moves only in its own spherical surface in ordinary operation, that is, without relative axial displacement of the two end members of the joint. Accordingly, splashing is minimized. Also, loss of energy and consequent heating are minimized.

In the modification shown in Fig. 8, only one of the parts of each space 60 is active. Part 60' operates as already described, while part 60" is in constant communication with the outside through the duct 95. It lets the oil leave part 60" the same way as it came into the part 60". Accordingly, this embodiment pumps less oil than the one first described, but also provides sufficient forced lubrication.

Figs. 9 and 10 illustrate an embodiment of the invention where the two coaxial sliding blocks 50' and 50" are rigid with one another. They are joined by connecting portions 100. The opposite centrifugal forces or inertia forces on the two blocks then directly balance one another. The coaxial blocks 50', 50" are journaled on a pivot pin 102 which extends through a bore in a hub 103. Pin 102 is secured in a central position in hub 103 by a screw 105 (Fig. 10) having a conical end 106 which engages in a matching recess provided in the pin 102. Hub 103 is integral with a shaft 49' constituting one end member of the joint. The other end member 40' is formed, as in the previously described embodiment of the invention, with plane-sided ways 46' in which the blocks 50', 50" engage slidingly. As in the previously described embodiment of the invention, also, opposite ends of pivot pin 102 are slotted to receive bars 56 operative as in the previously described embodiment.

The sides 68 of the blocks 50 or 50', 50" constitute the working sides and sliding surfaces of the blocks. They extend along parallel planes and may contain oil grooves if desired.

To facilitate formation of oil lubricating films, the generally plane sides of the blocks may be made, however, with ridges of minute height. Two forms of ridges are shown in Figs. 11 and 12. In the embodiment of Fig. 11, each side of the block 109 is formed with ridges 110 which extend along parallel straight lines from the bottom 111 of the block to its top 112. In Fig. 12 each side of the block 119 is formed ridges 115 extending from the bottom 116 of the block to its top 117 along diverging curved lines which are arcs of the same circle 118.

Fig. 13 is a fragmentary section of a block 50 having generally plane side surfaces 68. The two forms of ridge profiles are shown in Figs. 14 and 15, very much exaggerated. The ridge profile is composed of straight lines 114, 114' in Fig. 14 and is composed of an arc 120 in Fig. 15. The ridges are actually very flat, just enough to help in formation of an oil film wedge.

An important feature of the present invention is the use of yielding or resilient sliding blocks. Even when used on end members with a single pivot they have the advantage of cushioning and dampening vibrations. The preferred application of the resilient or yielding block is however to joints containing a plurality of pivot axes. They permit such an application without binding and without requiring backlash. In this application they add to the load capacity of a joint of given size and furthermore they transmit more nearly uniform motion than a rigid Cardan joint.

One form of yielding block will now be described with reference to Figs. 16 and 17. It is intended for moderate shaft angularities when used on spiders with a plurality of pivot axes. The sliding block 125 in this embodiment of the invention is made of a non-metallic and somewhat yielding material as, for instances, nylon or hard rubber or other plastic. To further reduce the rigidity between the working surfaces 68' of the block and its central hub portion 126, holes or perforations 127 are provided in the block in addition to recesses 128 in the ends of the block. In other words yielding is here achieved by the nature of the materials of which the block is made and by its shape. The holes 64' are part of the oil lines like those shown at 64 in Fig. 7. Also the annular space 65' and channels 66' correspond to the annular space 65 and channel 66, respectively, of Fig. 7 and serve for forced lubrication of the bearing surfaces 68' of the block.

Another form of yielding block is shown in Fig. 18. Here the rigid plates 136 which contain the generally plane working surfaces 68" of the block are yieldingly secured to the central or hub portion 137 of the block by rubber layers 138 which are bonded to the adjacent surfaces of both the plates 136 and the central portion 137. The central portion 137 of the block 135 is drilled for ducts 139, similar to ducts 64 of Fig. 7.

The term "rubber" is used throughout this specification and in the claims in its broadest meaning to designate a material which yields and has some resilience. It includes natural and synthetic rubber.

Figs. 19 and 20 show a yielding block 145 employing two rubber portions 148 in place of each of the single rubber layers 138 of Fig. 18. Each pair of rubber layers 148 in the embodiment of the invention shown in Fig. 18 is separated by an intermediate relatively rigid layer 147, so that outside plates 146 are secured to hub portion 150 of the block by a resilient yielding sandwich type connection. The central portion 150 of block 145 is drilled for ducts 149, similar to the ducts 64 of Fig. 7.

Figs. 19 and 20 also show a further important feature of the present invention, namely, a construction in which portions 146, that contain opposite working surfaces $68_1$, are rigid with one another and are connected through end portions 151 so that the block comprises a generally rectangular rigid outer layer connected by a resilient sandwich with the hub portion of the block.

The term rigid is to be taken in its customary sense, meaning relatively rigid and relatively stiff.

The outer portion or frame 146 is preferably made of metal, for instance, hard steel or cast iron, or sintered iron. The connection between the opposite working surfaces through end portions 151 is important in operation. It avoids undue backlash between the sliding blocks and their ways under load. Each block continues to fill the width of the slot, in which it engages, at all loads, because the two working sides of the block move together as a unit. Also when one side is under pressure the rubber on the opposite side takes part of the load. By contrast, a sliding block with working sides without rigid connection becomes sloppy under substantial load and then has backlash with reference to the ways it engages. When one side yields the other side does not expand to remain in contact with the guideway. It separates therefrom at substantial load. The separation could be counteracted by a substantial preload; but this is hardly practical because of the large friction and heating then developed even at moderate torque loads. All the embodiments of yielding blocks discussed hereafter show opposite working sides rigid with one another for these reasons. They form an important part of the invention.

Figs. 21 and 22 illustrate a universal coupling constructed according to this invention. It contains two identical universal joints 155 and 156, each having a spider 157 provided with a plurality of pivot portions 158 whose axes 159, and 160 intersect and are perpendicular to the axis 161, 161' of rotation of the respective joint. Yielding blocks 162 are mounted on said pivot portions to oscillate thereon in operation at shaft angularity. Each block 162 contains generally plane, parallel working sides 164. These engage the plane sides 165 of guide slots formed internally on a pair of connecting members 166 and 167. The yielding blocks may be constructed as already described or as will be described hereinafter. Their working surfaces are generally plane and may have shallow ridges as described with reference to Figs. 11 to 15 inclusive. Likewise all other embodiments of sliding blocks shown may contain such ridges if desired. Also the sliding blocks preferably contain the means for forced lubrication, either those described above or those described hereafter.

At their adjacent ends the pair of connecting members 166 and 167 have face coupling teeth 168 of known construction. These engage with each other. A sleeve 169 threads onto said adjacent ends which are provided with threads of opposite hand. Holes 170 are provided in the sleeve to afford a grip for turning the same. As the sleeve is turned in one direction the pair of members 166 and 167 approach each other and firmly grip each other to provide a rigid connection. Sealing is effected by a gasket 172 which is pressed between two rings 173 and 174 that are seated on the ends of the guide slot projections 163. On their confronting sides the rings 173, 174 have convex conical surfaces 175. These exert pressure on the gasket 172 in an axial and outward direction as the threaded sleeve 169 is tightened. A good seal is obtained in this way. At their remote ends the connecting members are sealed by flexible seals 180 of known construction which are secured to the connecting members 166 and 167 by means of rings 181 and flanged nuts 182. The latter thread on the ends of the respective members 166 and 167 and are provided with teeth 183 affording a grip for rotation. Each seal 180 is tightly secured at its other end to the shafts 184 and 185, respectively, by conventional clasps 187. Shafts 184 and 185 carry the spiders 157, which may be secured to the shafts through splined connections as shown, or may be formed integral with the shafts.

In this embodiment, with multiple pivot axes at each joint, it is important that yielding blocks be used to avoid binding or backlash.

Another embodiment of the invention is shown in Figs. 23 and 24. This universal joint is intended for larger shaft angularities than the joints of Figs. 21 and 22; and its sliding blocks 190 are designed to yield more than the ones previously described. Here, also, individual forced lubrication of each sliding block is preferably provided. Modified means for forced lubrication are used in the illustrated embodiment to readily permit an increased yield of the block. Here the ducts and valves are contained in the pivot portions 191 of the spider 192 rather than in the blocks themselves.

The spider constitutes one end member of the universal joint. It is here shown formed integral with its shaft 193. Each sliding block 190 is mounted on its pivot portion 191 to oscillate thereon. The blocks 190 engage guideways 194 provided internally in the other end member 195 of the joint. The sides 196 of these guideways are plane surfaces parallel to the axis 197 of end member 195.

Each sliding block is composed of a relatively rigid outer shell 198 (Figs. 23, 24 and 25) which has generally plane parallel working sides 199 similar to the sides 68 previously described. Each sliding block also has a rigid hub portion 200. The term "rigid" means relatively rigid. The hub portion has an extended base 201 from which project ribs 202. The hub portion of each block is mounted on a pivot portion 191 of spider 192. The ribs 202 extend in height generally parallel to the pivot axis 203 of each block 190. The ribs 202 extend about an axis 205 (Figs. 25 and 26) parallel to the sides 199, that is, parallel to the lengthwise direction of the block. This axis intersects the pivot axis 203 at a right angle at a point inward of the bottom of the block. This point is also the intersection 206 of the two axes 197, 207 of rotation of the joint. In the position shown in Fig. 23 the axis 205 coincides with the axis 207 of the spider 192 for the block shown in section. However, it is part of the block even though outside of it; and it moves with the block.

The side surfaces 208 of the ribs are surfaces of revolution. More particularly they are coaxial conical surfaces whose axis coincides with axis 205. The side profiles of the ribs include a slight angle with each other. If desired, however, parallel side profiles and plane sides could be provided.

The ribs 202 constitute guide projections. The outer shell 198 has projections 209 following said guide projections with clearance therebetween to form a space which is filled with rubber or other yielding substance 210 which is bonded to the adjacent sides of the projections 202 and 209. This yielding connection permits displacement of the shell 198 relative to the hub portion 200 substantially about the axis 205 of the guide projections 202. In this displacement the rubber between said adjacent sides is put under shear stress, and moreover under a nearly uniform shear stress. As the area of the contact surfaces is comparatively large this shear stress is moderate even at substantial loads. The amount of elastic yielding at a given load can be controlled by the thickness of the rubber. An increased rubber thickness at otherwise equal dimensions gives an increased amount of yielding at that load.

Each pivot portion 191 has a pair of slots or kerfs 215 (Fig. 30) formed adjacent its outer end. Each pivot 191 is also formed with a central bore 216 (Figs. 24 and 30). Pivotally mounted in this bore in a plug 218 (Figs. 24, 27 and 28). This plug forms a seat for a ball 219 constituting a ball valve. Each plug has a square hole 220 (Fig. 28) extending through it radially of its axis 221, which coincides with the pivot axis 203. A square bar 225 (Figs. 23 and 24) extends through the hole 220 and is held tightly therein by a set-screw 227 that threads into the plug 218 at its outside end. This bar passes through a pair of square holes provided in the hub 200 adjacent the outer end of the hub. For practical purposes then, each hub 201, bar 225, and the plug 218 are rigid with one another. Intake openings 230 (Fig. 30) are provided at the outer ends of each pivot portion 191 at opposite sides thereof. A slot 228 is provided in each outer shell 198 for assembly and disassembly of the associated bar 225.

In operation, at shaft angularity, each bar 225 projects at opposite ends through the kerfs 215 in the associated pivot 191 and its opposite ends oscillate, as the portion 200 of the associated block 190 oscillates, in space 229 provided adjacent the end of each pivot portion 191 and bounded by the inside cylindrical surface of the hub 200 (Fig. 29). Intake openings 230 (Fig. 30) are unsymmetrical, as shown, to confine the oil pumping action to two diagonally opposite chambers of the four formed in the space 229 by bar 225.

The oil pumping action is similar to the one described for the previous embodiment. However, the pressure line is here in the pivot portion. A groove 232 is provided in the bottom of each bar 225 that is inclined to the lengthwise direction of the bar and that connects the two working chambers with the center of the plug 218 and with each other. Thence fluid pressure lines lead through bore 233 of the plug to the associated ball valve 219 and to the larger bore 216 drilled in the center of the pivot portion 191. From there drill holes 236 (Fig. 24) lead to the outside surface of the pivot portion, and other channels or drill holes 237 and 238 lead to the outside sliding surfaces 199 of the block 198. The holes 238 are formed in a neoprene or rubber part 240 bonded to the outer shell 198 of the block. This part is made yielding so as not to confine unduly the motion of the outer shell on the pivot portion of the sliding block.

Figs. 31 to 33 illustrate a modified form of sliding block such as might be used in the universal joint of Figs. 23 and 24 and in other joints. This block 245 also comprises and outer shell 246 and a hub portion 247. The outer shell consists of two parts 245' and 245" which are bonded or cemented together at 248 generally along a plane perpendicular to the lengthwise direction of the block and containing the pivot axis 249 (Fig. 32). Instead of the flat joining surfaces shown, other surfaces as, for instance, V-shaped joining surfaces may be used which extend generally along said plane.

The hub portion 247 of block 245 contains guide portions 250 (Fig. 32) projecting away from the hub in a general direction of the length of the block. These portions contain coaxial surfaces of revolution whose axis 252 is parallel to the working sides 254 of the block and intersects the pivot axis 249 at a point 255 inward of the bottom 256 of the block.

The outer shell 246 of block 245 has projections 257 whose side surfaces follow the surfaces of revolution of the projections 250 of the hub and are spaced therefrom to provide a clearance space filled with rubber 258 which is bonded to the adjacent surfaces of the projections 250 and 257. The axis 252 passes through the joint center 255 and corresponds exactly to the axis 205 in the embodiment shown in Figs. 23 to 25. The rubber 258 may be put under preload if desired.

In the embodiment shown in Figs. 31 to 33 inclusive the bar 225' has sloped ends 259 which are held in a slot provided in the hub portion 247.

The displacement of the outer shell 246 with respect to the hub portion 247 is the same as described as above. Here, also, such displacement puts the rubber under a nearly uniform shear stress.

A still more nearly uniform shear stress could be attained in both cases, if desired, by increasing the thickness of the rubber in direct proportion to the distance from the axis 205 or 252. In such case the outer rubber layer would be thicker than the rubber layer further to the inside in proportion to its larger distance from the axis 252. In Fig. 23 the side surfaces of the projections 209, 210 would not then be exactly parallel but would diverge toward the outside, their straight profiles intersecting in the axis 205.

The rubber of the split sliding block in the embodiment of the invention shown in Figs. 31 to 33 inclusive may be put under preload if desired.

The bottom view of Fig. 34 shows a sliding block 265 made according to a still further embodiment of the invention. This block comprises an outer shell 266 and a hub portion 267. The latter has central projections 268 which extend radially outwardly from the hub in the lengthwise direction of the block. Rubber blocks 269 are bonded to the projections 268 and to the outer shell 221 and afford a yielding connection therebetween.

While the invention has been described in connection with several different embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint for connecting two relatively rotatable end members having a pivot axis radial of its axis of rotation, a connecting member pivoted on said radial axis and operatively connecting said two end members, a bar connected to one of the two parts that have relative pivotal motion and the other of said two parts having a space in which said bar oscillates as the joint rotates with the axes of the end members disposed at an angle to one another, said bar dividing said space into two chambers at opposite sides of the bar which vary in volume as the bar oscillates and one of said two parts having openings in it communicating with said chambers to alternately supply lubricant to each chamber and discharge the lubricant therefrom as the bar oscillates.

2. A universal joint comprising two end members having intersecting axes of rotation, one of said end members having a pair of pivots having axes radial to its axis of rotation, a pair of sliding blocks pivotally mounted on said pivots, the other end member having guideways engaged by said sliding blocks, and a lubrication pump for each sliding block comprising a bar secured to each sliding block and extending through a recess in its pivot, an intake opening disposed at the outside end of said pivot and communicating with said recess and governed by said bar, a pressure line extending partly along the axis of the associated pivot and a valve mounted in said pressure line.

3. A universal joint comprising two end members having intersecting axes of rotation, one of said end members comprising a spider having a plurality of pivot portions whose axes intersect and are radial of the axis of rotation of said spider, a sliding block mounted on each pivot portion to oscillate thereon, each block having a hub portion mounted on the pivot portion and a plane-sided working portion yieldingly connected to its hub portion by a plurality of layers of rubber-like material bonded to both portions, said layers extending in a direction perpendicular to the working surfaces of said working portion, and the other end member having longitudinally extending, plane-sided ways that are slidingly engaged by the working portions of said blocks.

4. A universal joint comprising two end members having intersecting axes of rotation, one of said end members comprising a spider having a plurality of pivot portions whose axes intersect and are radial of the axis of rotation of said spider, a sliding block mounted on each pivot portion to oscillate thereon, each block having a hub portion which is mounted on its pivot portion and a working portion, said working portion comprising side portions which are rigidly connected with each other and which are yieldingly connected to the hub portion of the block, the yielding connection comprising a plurality of interengaging rib-like projections held together with rubber-like material, and the other end member having ways that are slidingly engaged by the working portions of said blocks.

5. A universal joint comprising two end members having intersecting axes of rotation, one of said end members comprising a spider having a plurality of pivot portions whose axes intersect and are radial of the axis of rotation of said spider, a sliding block mounted on each pivot portion to oscillate thereon, each block having a hub portion which is mounted on its pivot portion and a working portion, said working portion comprising side portions which have generally plane working surfaces, the side portions of a block being rigidly connected with one another and being yieldingly connected to the hub portion of the block to yield in a direction generally perpendicular to said working surfaces, the yielding connection comprising interengaging rib-like projections on said side portions and said hub portion that are yieldingly connected together, and the other end member having ways that are slidingly engaged by the working surfaces of the blocks.

6. A block for connecting the two end members of a universal joint and adapted to have pivotal connection with one end member and sliding connection with the other end member, said block comprising a hub portion and a working portion, said working portion having opposite sides and a plurality of rib-like projections rigidly connecting said sides, and means for yieldingly connecting said hub and working portions comprising projections interengaging with the first-named projections and rigid with said hub, and yielding rubber-like material connecting said interengaging projections and bonded to both.

7. A block for connecting the two end members of a universal joint and adapted to have pivotal connection with one end member and sliding connection with the other end member, said block comprising a hub portion and a working portion, said working portion having opposite sides, and a plurality of rib-like projections extending in a direction generally perpendicular to the working faces of the block and rigidly connecting said sides, and means for yieldingly connecting said hub and working portions comprising a plurality of projections interengaging with the first-named projections and rigid with said hub, and rubber-like material connecting said interengaging projections, said interengaging projections confining the yielding movement of the hub and working portions relative to one another substantially to a plane perpendicular to said sides and containing the pivotal axis of the block.

8. A block for connecting the two end members of a universal joint and adapted to have pivotal connection with one end member and sliding connection with the other end member, said block comprising a top, a bottom, a working portion having generally plane, parallel working sides and a plurality of rib-like projections rigidly connected with said sides, said projections being curved about an axis parallel to the working sides and to the bottom of the block and disposed inwardly of the bottom of the block, and a hub portion having projections interengaging with the first-named projections and yieldingly connected thereto.

9. A block for connecting the two end members of a universal joint and adapted to have pivotal connection with one end member and sliding connection with the other end member, said block comprising a working portion having generally plane, parallel working sides which are rigid with one another, a rigid hub portion having a central bore and guide projections which extend about an axis which is parallel to said working sides and which intersects the axis of said bore in a point below the bottom of the block, the working portion of the block having projections interfitting with said guide projections and bonded to both.

10. A block for connecting the two end members of a universal joint and adapted to have pivotal connection with one end member and sliding connection with the other end members, said block comprising a rigid outer shell having generally plane, parallel working sides, a rigid hub portion having a central bore and rib-like guide projections which extend in height in a direction generally parallel to the axis of said bore and whose side surfaces are surfaces of revolution having a common axis which is parallel to said working sides and which intersects the axis of said bore at right angles in a point inwardly of the bottom of the block, said outer shell having projections intermeshing with said guide projections, and rubber disposed between intermeshing projections and bonded to both.

11. A block for connecting the two end members of a universal joint and adapted to have pivotal connection with one end member and sliding connection with the other end members, said block comprising a rigid outer shell having generally plane, parallel working sides, a rigid hub portion having a central bore and rib-like guide projections which extend in height in a direction generally parallel to the axis of said bore and whose side surfaces are conical surfaces having a common axis parallel to said working sides and which intersects the axis of said bore in a point inwardly of the bottom of the block, said outer shell having projections intermeshing with said guide projections, and rubber disposed between intermeshing projections and bonded to both.

References Cited in the file of this patent

UNITED STATES PATENTS

| | | |
|---|---|---|
| 1,966,486 | Cutting | July 17, 1934 |
| 2,145,532 | Standage | Jan. 31, 1939 |
| 2,365,772 | O'Malley | Dec. 26, 1944 |
| 2,555,921 | Davis | June 5, 1951 |
| 2,617,279 | Miller | Nov. 11, 1952 |